Aug. 14, 1945. C. E. MASON 2,382,895
CONTROL MECHANISM
Original Filed March 27, 1942  3 Sheets—Sheet 1

INVENTOR
Clesson E. Mason
BY
Blair, Curtis + Hayward
ATTORNEYS

Aug. 14, 1945.  C. E. MASON  2,382,895
CONTROL MECHANISM
Original Filed March 27, 1942  3 Sheets-Sheet 2

INVENTOR
*Clesson E. Mason*
BY *Blair, Curtis + Hayward*
ATTORNEYS

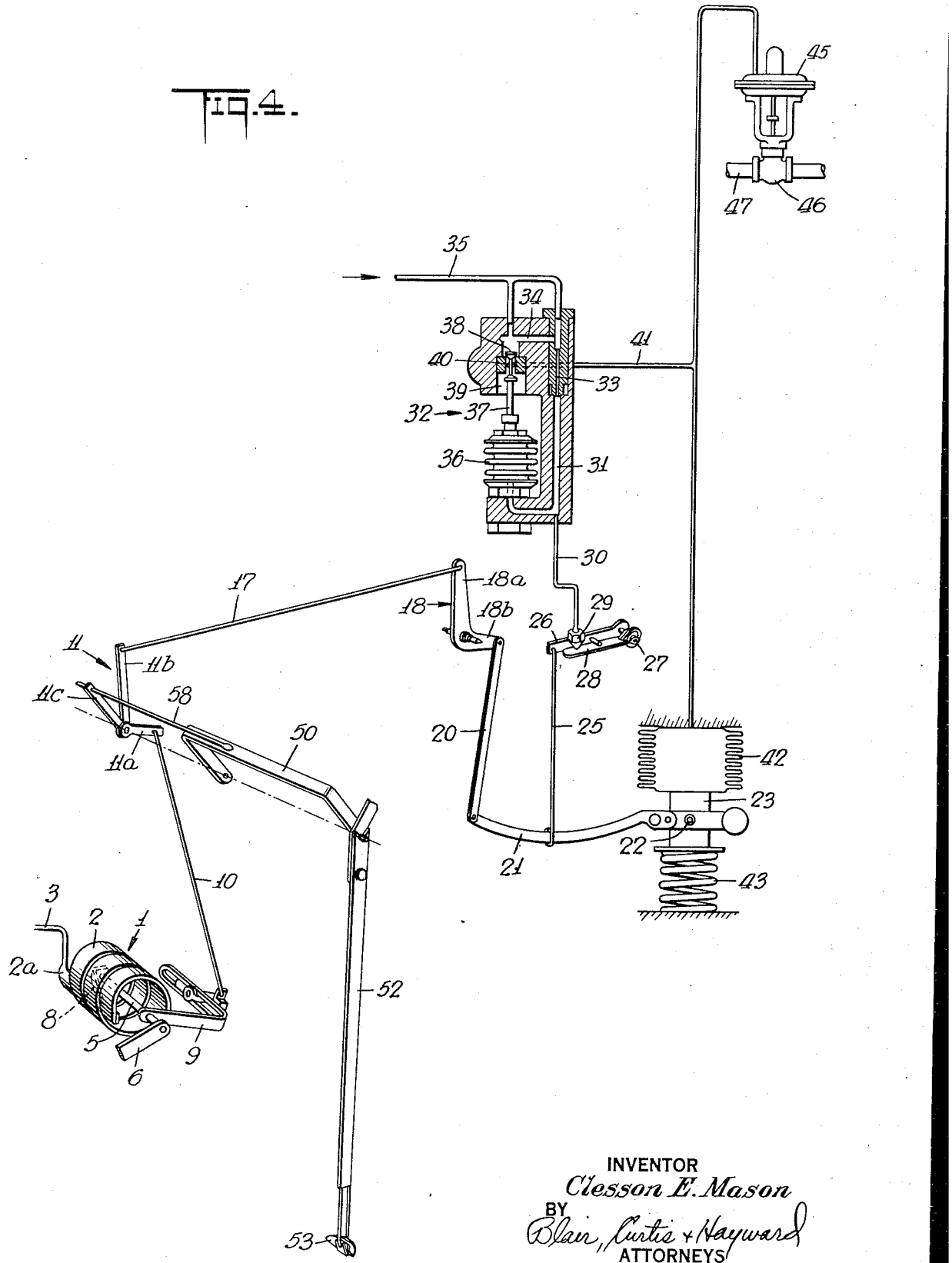

UNITED STATES PATENT OFFICE 2,382,895

CONTROL MECHANISM

Clesson E. Mason, Brookline, Mass., assignor to The Foxboro Company, Foxboro, Mass., a corporation of Massachusetts Original application March 27, 1942, Serial No. 385,493. Divided and this application April 10, 1943, Serial No. 482,584

3 Claims. (Cl. 236—82)

This invention pertains to apparatus for recording and controlling the value of a condition of an industrial process, as, for example, recording and controlling the temperature of a process by regulating fuel flow affecting the temperature. In particular, the invention relates to improved apparatus for combining with a highly responsive controller, recording mechanism for recording the value of the condition being controlled by the controller without interfering with the operation of the controller in controlling the process.

An object of the invention is to provide novel apparatus for recording the value of a condition being controlled when both the recording and controlling instrumentalities are made responsive to the same measuring element.

Other objects will be in part obvious, and in part pointed out hereinafter.

The present application is a division of my copending application, Serial No. 385,493, filed March 27, 1942.

In the drawings,

Figure 4 is a diagrammatic perspective view showing generally how the recording apparatus may be utilized with a highly responsive controller.

Figure 1:
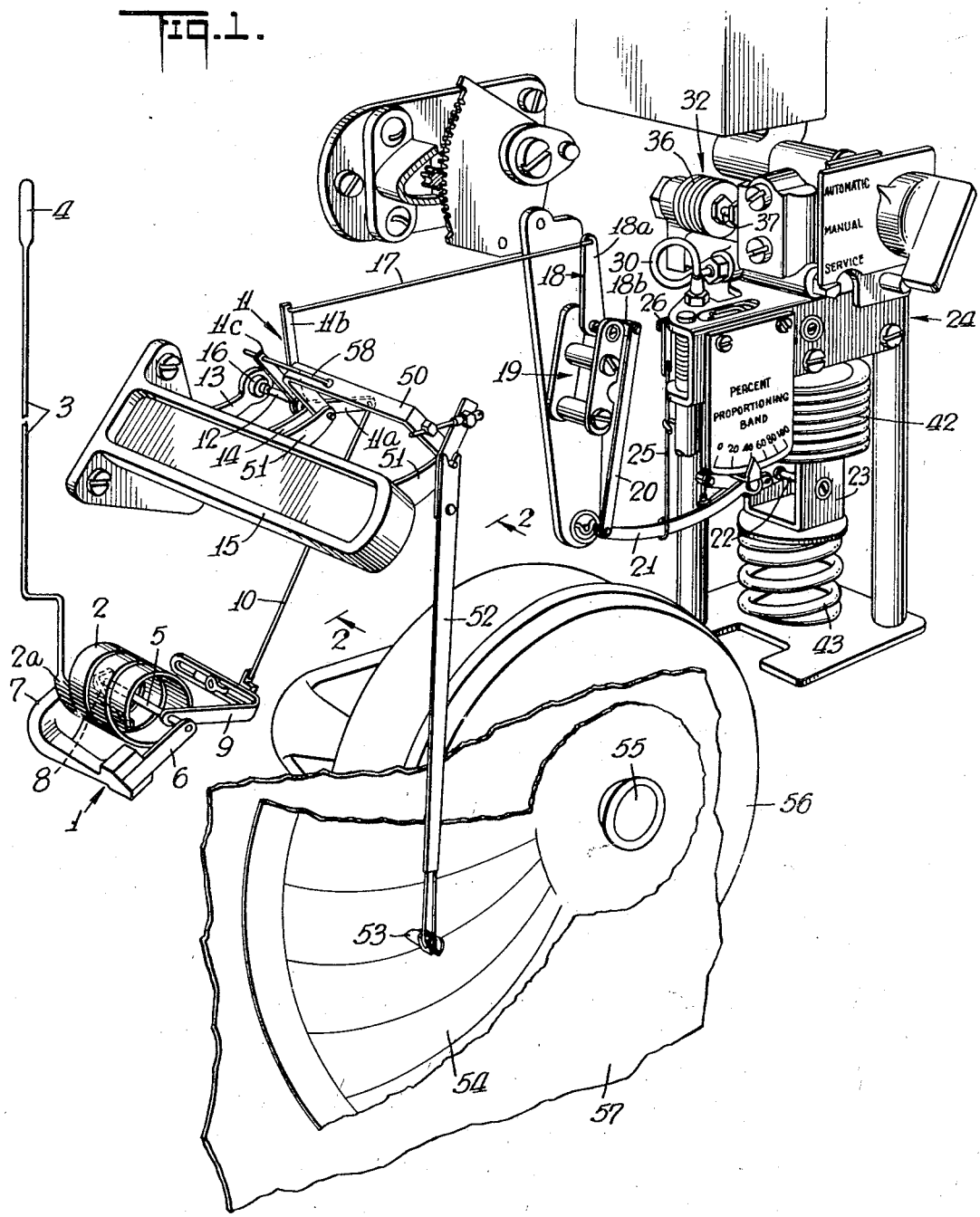
Figure 1 is a perspective view of a combination recorder controller embodying the present invention.

Automatic controllers for controlling industrial processes operate in response to changes in the value of a condition of a process being controlled to manipulate a variable which affects the condition being controlled. For example, if the condition of the process to be controlled is its temperature, then the controller in response to the changes in the temperature will manipulate some variable, such as flow of fuel, to maintain the temperature at the desired value. Present day controllers are called upon to control many kinds of processes which are inherently very difficult to control because of the presence of so-called process lags. Such lags retard the process in responding to changes in the manipulated variable and, unless the controller is made highly responsive to the slightest change in the condition being controlled, and is able to convert such small changes into suitably proportioned control effects, then the controller may be unsatisfactory in its control performance and cause the process to cycle badly or to permit it to depart undesirably from the manner in which it is intended to operate.

Controllers are provided with a so-called measuring element which moves in response to changes in the value of the condition being controlled. This measuring element must be made highly responsive to changes in the value of the condition in order for the controller to perform satisfactorily. If the controller is controlling a temperature condition, the measuring element should be made to move proportionately to even the slightest changes of the temperature in order that the controller may itself be responsive to the slightest changes in temperature and make properly proportioned control effects in response thereto.

It is desirable in many instances to combine a recording mechanism with the controlling mechanism so as to record on a moving chart the value of the condition being controlled—and to use the same measuring element to drive the pen of the recording apparatus as is used to transmit the changing values of the controlled condition to the controller. Where the recording is performed by a pen which is caused by the measuring element to traverse a chart surface moving under the pen, the friction between the pen and the chart may be sufficient to hold back the measuring element from moving in response to slight changes in the condition being controlled and recorded, and so prevent the measuring element from transmitting to the controller such slight changes. Such an arrangement, particularly when the controller is applied to the control of processes that are inherently difficult to control, may interfere with the best operation of the controller. The term "pen" as herein used is intended to apply to any type of stylus mechanism used for making a record on a chart.

In the present invention, provision is made in a combination recorder controller for the measuring element to transmit to the controller even the slightest changes in the condition being measured without interference from the friction between the pen and the chart over which the pen moves, while at the same time provision is made for obtaining a satisfactory record of the condition being controlled.

The measuring element may be a helical or spiral hollow tube having a fixed end and a free end, and so connected with respect to the condition being controlled that variations in the condition cause the free end of the measuring element to move.

Referring to Figure 1, there is shown a combination recorder controller of a type particularly adapted to respond to even slight changes in a condition of a process being controlled, and to translate such slight changes into valve action regulating flow affecting the condition. Referring to the left-hand side of the drawings, there is shown, generally indicated at 1, a measuring element, including a hollow helical tube 2, the interior of which is connected by a tube 3 to a thermometer bulb 4, adapted to be exposed to a temperature to be controlled. The bulb 4, tube 3, and the hollow helix 2, are filled with a suitable fluid that increases the pressure in the hollow tube 2 as the temperature of the bulb increases, and decreases the pressure in the hollow tube 2 as the temperature of the bulb 4 decreases. The hollow tube is fixed at its inner end 2a, but its outer end is left free so that as the pressure within the helix increases or decreases, the helix unwinds and winds, thereby moving the free end in a clockwise or counter-clockwise direction. Mounted within the helix and coinciding with the axis thereof, is a shaft 5, supported between supports 6 and 7, so that the shaft is free to turn with a minimum of frictional resistance. The free end of the helix is mechanically connected by a suitable metal strip 8 (shown in dotted lines in the drawings) to the shaft 5, so that as the free end of the helix moves, the shaft 5 moves in correspondence.

Figure 2:
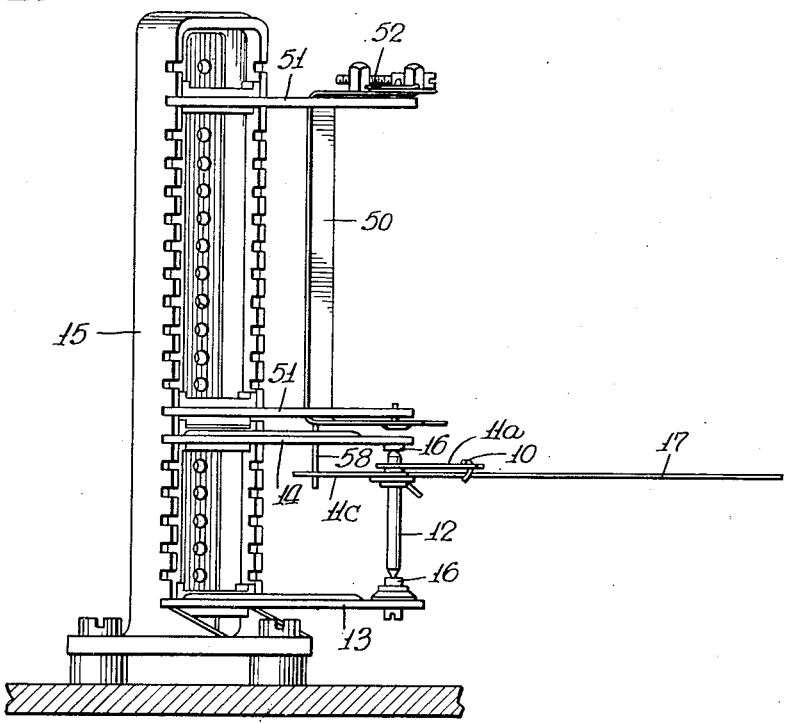
Figure 2 is a view looking from line 2—2 of Figure 1.

Fixed to the shaft 5 is an arm 9, which arm is connected by means of a link 10 to a crank, generally indicated at 11. The crank 11 is mounted on a shaft 12, mounted between supports 13 and 14 extending from a main support 15 mounted on the base of the instrument. Referring to Figure 2, this shaft is mounted in jewel bearings 16 so that it is free to move.

As shown in Figure 1, the link 10 is mechanically connected to an arm 11a of the crank. The connections between the link 10 and the arm 9, and the arm 11a, are loose so that pivoting of the arms 9 and 11a is not bound or interfered with by the movement between the link 10 and the respective arms. The looseness of the connections is at all times taken up by a slight clockwise movement that is imparted to the crank 11 by the mechanism of the controller.

With this mechanical construction the crank 11 is caused to move in accordance with the slightest movement of the free end of the helix 2 without offering resistance to its movement. Consequently, the crank 11 is caused to move in accordance with the slightest changes in the temperature in the bulb 4.

Referring again to Figure 1, the motion of the crank 11 is transmitted by its arm 11b to a link 17, which link is in turn connected to a counterbalanced crank, generally indicated at 18, and having an upright arm 18a and a horizontal arm 18b. The crank 18 is fixed to a shaft which is suitably supported in jewel bearings in a support, generally indicated at 19. The link 17 is so connected to the responsive arms 11b and 18a that in translating the movement of the arm 11b to the arm 18a it offers no frictional resistance, i. e., a minimum of frictional resistance. In this manner the crank 18 is also caused to move in accordance with even the slightest changes in the temperature in the bulb 4.

The arm 18b is mechanically connected by a link 20 to the left end of an arc lever 21, which is part of the control mechanism proper. This arc lever is fixed to a shaft 22 mounted in suitable jewel bearings held in a floating frame 23 so that the arc lever 21 is free to pivot about its axis; i. e., that of the shaft 22, without frictional resistance. Accordingly, the left end of the arc lever 21 is caused to move in exact accordance with even the slightest changes of temperature of the bulb 4.

The control mechanism, Figure 1, which is generally indicated by 24, does not form part of the present invention, but is covered in the above-mentioned parent application. However, to complete the present description reference is made to Figure 4 which shows diagrammatically how the particular controller disclosed operates. In Figure 4 the linkage mechanism just described is diagrammatically shown with most of the supporting parts omitted. The arc lever 21 is connected by a link 25 to a baffle operating lever 26, suitably mounted on shaft 27. The shaft 27 is preferably mounted in jewel bearings so that it offers no resistance to movement by the link 25. Also carried by the shaft 27, and freely mounted thereon, is a baffle 28, urged by a light spring against the underside of a pin on the baffle operating lever 26. The baffle 28, which normally moves with the operating lever 26, offers no frictional resistance to movement of the link 25.

The baffle 28 forms, with a nozzle 29, a control couple as described in Mason Patent Re. 20,092. The nozzle 29 is stationary and is supplied with a restricted flow of air by means of a tube 30, a passage 31 in the body of a relay valve (generally indicated at 32), a restriction 33, a passage 34, and an air supply line 35 supplied with air at a regulated pressure of, for example, 16 lbs./sq. inch. The air issues as a jet from the nozzle.

Small relative movement of the baffle 28 with respect to the nozzle 29, is sufficient to cause the pressure behind the nozzle to vary considerably. For example, movement of the baffle 28 1/1000 of an inch away from the nozzle is sufficient to cause minimum pressure to exist in the line 30, and movement of the baffle to the nozzle is sufficient to cause maximum pressure to build up in the line 30.

This pressure variation back of the nozzle is made to operate the relay valve 32 in the following manner. The relay valve includes a bellows 36 fixed at its lower end. Passage 31 connects with the interior of the bellows 36. Bellows 36 has a spring characteristic so that as the pressure in the line 31 and in the interior of the bellows decreases, the bellows contracts, and as it increases the bellows expands. The free end of the bellows carries a valve stem 37 on which is mounted a double valve head 38 so that the valve head 38 is moved by the contraction and expansion of the bellows 36. The valve head 38 is mounted in a chamber 40 connected at its upper end with a supply pressure from the line 35, and at its lower end through a passage 39 with the atmosphere. When the valve head is retracted, as by the contraction of the bellows 36, it closes off the chamber 40 from the supply and opens the chamber 40 to the atmosphere. When the valve head is extended, as by expansion of the bellows 36, it opens the air supply to the chamber 40, and shuts off the chamber from the atmosphere. Intermediate positions of the double valve head permit intermediate pressures, i. e., between atmosphere and the supply pressure, to exist in the chamber 40.

In the above manner, movement of the baffle 28 to the nozzle 29 causes the pressure in bellows 36 to build up to increase the pressure in chamber 40, and movement of the baffle 28 only slightly from the nozzle 29 causes the bellows 36 to contract to reduce the pressure in chamber 40.

The chamber 40 is connected by a line 41 to the interior of a bellows 42, fixed at its upper end and free to move at its lower end. Below the bellows 42 is a compression spring 43, fixed at its lower end. Mounted between the free end of bellows 42 and the free end of the spring 43 is the floating frame 23. The interior of the bellows, therefore, is always connected with the pressure existing in the chamber 40 and because of the characteristics of spring 43, the free end of the bellows assumes positions corresponding to the pressure in the interior thereof. The floating frame 23 and the shaft carrying the right end of the arc lever 21 likewise are positioned by the free end of the bellows 42.

With this mechanism as described, the bellows 42 coacting with the control couple and the relay valve serves at all times to keep the baffle 28 tangent to, i. e., within its very small operating range with respect to, the nozzle. Thus, assuming a given position of the left end of the arc lever 21, the bellows 42 will position the right end of the arc lever 21 so as to hold the baffle tangent to the nozzle 29. The slightest movement of the baffle 28 away from the nozzle would cause pressure back of the nozzle to reduce to keep the baffle 28 tangent to the nozzle 29, as above described.

If the left end of the arc lever 21 rises even the slightest amount, pressure in the bellows 42 will increase a proportional amount to move the arc lever 21 sufficiently to keep the baffle 28 tangent to the nozzle 29. Even the slightest movement of the lever end of the arc lever 21 is, in this manner, translated into a corresponding pressure change in the bellows 42, and so in the diaphragm motor 45. Since the left end of the lever 21 is positioned through the linkage mechanism described by the pressure in the helix 2, and since the linkage mechanism as above described is so constructed as to transmit even the slightest movements of the helix 2 to the arc lever 21, the pressure in bellows 42 is made to change in response to even the slightest movements of the helix, and so to slightest changes of the temperature of the bulb 4.

Condition-responsive elements, such as are shown at numeral 1 in the drawings, are capable of exerting only a relatively small force when moving in response to pressure changes in them, but nevertheless, by reason of the construction of the control instrument, the force that the element can exert even for small movements is high as compared with the force required to move the arc lever and connecting links of the controller. Consequently, the controller may be made highly responsive to even slight changes in the value of the condition being controlled.

Turning now to a consideration of the recording part of the controller and to Figure 1, there is shown mounted on the support or post 15 a U-shaft which is pivoted from two supporting arms 51, extending from the post 15. The axis of the U-shaft 50 is coincident with that of the shaft 12. Fixed to the U-shaft 50 and extending downwardly therefrom, is a pen arm 52 carrying a pen 53. As the U-shaft 50 pivots about its support, it moves the pen arm 52 and the pen 53 transversely of a rotating chart 54, suitably mounted on a hub 55, extending from a clock 56. A chart back plate 57 is provided to back up the chart.

The U-shaft 50 is mechanically connected, as will be described, with the crank 11 which is pivoted by the measuring element 1. In such a recording apparatus there is generally some friction between the pen proper and the chart on which it runs, and as above described, the disturbing effect that such friction would have on the operation of the controlling part of the apparatus may be appreciable. In the present invention this interference is overcome by driving the U-shaft 50 from the crank 11 through a resilient connection. This permits the slightest of movements of the helix 2 and the linkage mechanism connecting it to the arc lever 21, even though the U-shaft 50, the pen arm 52, and the pen 53 may be held from such slight movements by the above-mentioned friction. This resilient connection is provided by a resilient wire link 58 fixed to the U-shaft 50 and extending rearwardly through a hole in an arm 11c of the crank 11. Whereas this resilient link 58 drives the U-shaft 50 and pen 53 with sufficient accuracy to give the desired recording, it yields sufficiently to permit the helix 2 to operate the connecting linkage and the arc lever 21 so that the latter is free to respond to the slightest changes of pressure in the helix 2, even though such slight changes of pressure do not produce sufficient force to overcome the friction between the pen and the chart, or the friction of the U-shaft 50.

Figure 3:
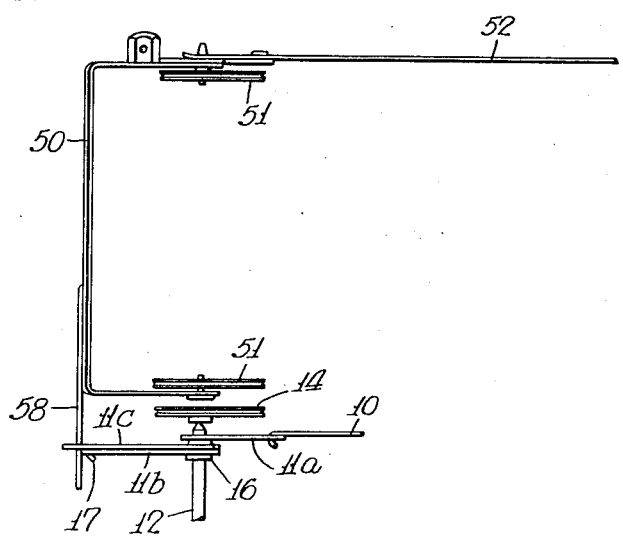
Figure 3 is a detailed view of a resilient driving connection between a measuring element operated crank and a pen arm supporting shaft.

Referring to Figures 2 and 3, the construction of the U-shaft 50 and of the connecting link 58 is shown in greater detail. The wire link 58 is shown soldered to the U-shaft 50 and extending parallel to the shaft through a hole in the arm. The link 58 is sufficiently long from its point of connection on the U-shaft 50 to the arm 11c so that it can yield to permit the small movements of the arm 11c to take place as above described even though the U-shaft 50 be held back. However, the link is sufficiently resilient that it keeps the alignment between the arm 11c and the U-shaft 50 sufficiently accurate to insure satisfactory recording of the temperature.

As many possible embodiments may be made of the above invention, and as many changes may be made in the embodiment above set forth, it is to be understood that all matter hereinbefore set forth or shown in the accompanying drawings is to be interpreted as illustrative and not in a limiting sense.

I claim:

1. In a recorder controller for controlling a condition by regulating a variable affecting the condition and recording the value of the condition on a chart, the combination of a responsive element continuously and proportionally movable in response to the changes in the value of the condition, movable control means for establishing a control force for regulating the said variable affecting the condition, linkage mechanism adapted to move in response to the slightest movement of said responsive means and to transmit said movement to said movable control means, recording mechanism including a pen movable over a traveling chart, and means for driving said pen by said responsive means including a shaft for supporting said pen, an arm mounted on a shaft whose axis is concentric with said first shaft, and a yielding resilient wire link fixed with respect to said first shaft and extending parallel to but spaced from its axis into a hole in said arm.

2. In a recorder controller for controlling a condition by regulating a variable affecting the condition and recording the value of the condition on a chart, the combination of a responsive element continuously and proportionally movable in response to the changes in the value of the condition, movable control means for establishing a control force for regulating the said variable affecting the condition, linkage mechanism adapted to move in response to the slightest movement of said responsive means and to transmit said movement to said movable control means, recording mechanism including a pen movable over a traveling chart, and means for driving said pen by said responsive means including a shaft movable about a fixed axis for supporting said pen, an arm mounted on a second shaft movable about the same axis as said first shaft, and a yielding resilient wire link having one end fixed with respect to said first shaft and extending into a hole in said arm, the connections between said wire link and said arm being spaced from said second shaft.

3. In a recorder controller for controlling a condition by regulating a variable affecting the condition and recording the value of the condition on a chart, the combination of a responsive element continuously and proportionally movable in response to the changes in the value of the condition, movable control means for establishing a control force for regulating the said variable affecting the condition, linkage mechanism adapted to move in response to the slightest movement of said responsive means and to transmit said movement to said movable control means, recording mechanism including a pen movable over a traveling chart, and means for driving said pen by said responsive means including a shaft movable about a fixed axis for supporting said pen, an arm mounted on a second shaft movable about the same axis as said first shaft, and a yielding resilient wire link having one end fixed with respect to one of said shafts and having a portion near the other end positively angularly aligned but not axially fixed with respect to the other of said shafts, the connections between said wire link and said shafts being spaced.

CLESSON E. MASON.